(12) United States Patent
Ceney

(10) Patent No.: US 6,204,771 B1
(45) Date of Patent: Mar. 20, 2001

(54) LOAD INDICATING FASTENER SYSTEMS METHOD AND APPARATUS

(75) Inventor: Stanley Ceney, Wolverhampton (GB)

(73) Assignees: Ronald C. Clarke; Philomena J. Clarke, both of Phoenix, AZ (US)

( * ) Notice: Subject to any disclaimer, the term of this patent is extended or adjusted under 35 U.S.C. 154(b) by 0 days.

(21) Appl. No.: 09/485,968

(22) PCT Filed: Aug. 17, 1998

(86) PCT No.: PCT/US98/17060

§ 371 Date: Feb. 18, 2000

§ 102(e) Date: Feb. 18, 2000

(87) PCT Pub. No.: WO99/09327

PCT Pub. Date: Feb. 25, 1999

(30) Foreign Application Priority Data

Aug. 19, 1997 (GB) .................................................. 9717566
Sep. 1, 1997 (GB) .................................................. 9718332

(51) Int. Cl.[7] .................................................. G08B 21/00
(52) U.S. Cl. .................. 340/665; 340/572.1; 73/761; 73/779; 73/780; 411/14; 331/65; 336/200; 356/375; 356/381; 250/559.19; 250/559.27
(58) Field of Search .................................. 340/665, 551, 340/572.1; 73/761, 779, 780; 411/14; 331/65; 336/200; 356/375, 381; 250/559.19, 559.27

(56) References Cited

U.S. PATENT DOCUMENTS

| | | |
|---|---|---|
| Re. 30,183 | 1/1980 | Popenoe .................................. 73/761 |
| 4,294,122 | 10/1981 | Couchman .............................. 73/761 |
| 4,899,591 | 2/1990 | Kibblewhite ............................ 73/761 |
| 5,386,733 | 2/1995 | Hesthamar et al. ............ 73/862.333 |
| 5,388,463 | 2/1995 | Scott ..................................... 73/761 |
| 5,392,654 | 2/1995 | Boyle .................................... 73/761 |
| 5,437,525 * | 8/1995 | Bras ...................................... 411/14 |
| 5,461,923 * | 10/1995 | Meisterling ............................ 73/761 |
| 5,691,815 | 11/1997 | Huber et al. ......................... 356/375 |
| 5,721,380 * | 2/1998 | Gozlan .................................. 73/761 |
| 6,009,759 * | 1/2000 | Kibblewhite et al. ................. 73/761 |

* cited by examiner

Primary Examiner—Benjamin C. Lee
(74) Attorney, Agent, or Firm—Donald J. Lisa (57) ABSTRACT

A fastener system employs a portable, sensing device, such as one or more reactance capacitors or an image processor such as a camera or a laser, which removably attaches adjacent to the fastener to detect and measure the change in a gap or specialized form of the bolt head or associated washer caused by the relative movement of portions of the fastener system when the fastener is under strain without contacting the sensed portions undergoing the significant relative movement. Associated electronic components process and indicate the clamp load of the fastener system. Embodiments of the relatively moving portions which provide a resilient, repeatable changing gap or form under load include inward movement of a cylindrical bar anchored in a bore in the head and shank relative to the flush outer top surface of the bolt head, a washer form change relative to the outer surface of the clamped joint, a form change in one portion of a bolt head relative to another portion of the bolt head, and a washer form change relative to a bolt head form change.

32 Claims, 8 Drawing Sheets

LOAD INDICATING FASTENER SYSTEMS METHOD AND APPARATUS

BACKGROUND OF THE INVENTION AND PRIOR ART

1. Field of the Invention

This invention relates to load indicating fastener systems that are adapted to indicate loads to which they are subjected and, more specifically, to a non-contact electronic device, such as a reactance capacitor, which measures a changing air gap or form produced when a fastening system is strained, and, more specifically, to a non-contact image processing or laser device, which measures a changing air gap or form produced when a fastening system is strained.

2. Description of the Related Art

It is desirable that applied fasteners systems should be accurately tightened to the designed load levels in order to ensure the structural integrity of the bolted joint. It is well known that indicating strain gives a true representation of the load induced in the fastener systems. Torque wrenches are commonly used for tightening fasteners to predetermined torque levels, but they are subject to unpredictable friction so that the strain produced can be widely inaccurate. In other words, controlling torque will not lead to accurate loading of a fastener system.

Prior Contact-Type Fastener Extension Measuring Devices

Some measuring devices, for instance linear transducers, need to make physical contact to be functional. These contact methods are inherently difficult to use in the field. The measurements of strain are extremely small and any surface contamination (corrosion, dirt, natural abrasives, in service damage, etc.) leads to significant errors. Accordingly, it is an object of the present invention to measure strain by using a non-contact device and method.

Prior Non-Contact-Type Fastener Extension Measuring Devices And Methods

Previous non-contact-type devices and methods of measuring the extension of a fastener under strain have utilized electrical components within each individual fastener, typically a bolt or a stud. These earlier methods have a number of significant problems associated with them.

One problem with previous non-contacting measuring devices is that it is prohibitively expensive to instrument each individual fastener with electrical components. Additionally, the integrated instrumentation compromises the integrity of the fastener and is not suitable for the rugged environments of many applications. Accordingly It is an object of the present invention is to provide a cost effective load indicating fastener in which the fastener itself carries no electric parts.

A further problem with previous non-contacting measuring devices is that they typically require complex modification of the fastener making the manufacturing process difficult. Accordingly, it is an object of the present invention to measure the fastener extension using a simple device and method which require only a slight modification to the fastener system which is readily and easily incorporated during the manufacturing process.

BRIEF SUMMARY OF THE INVENTION

Set forth below is a brief summary of the invention which achieves the foregoing and other objects and provides the foregoing and hereafter stated benefits and advantages in accordance with the structure, function and results of the present invention as embodied and broadly described herein. Applicant's invention includes independently both the apparatus and the methods described herein which achieve the objects and benefits of the present invention. Both formats of the invention are described below, and it is applicants intention to claim both formats even though from time to time below for purposes of clarity and brevity applicant will use either one or the other format to describe various aspects and features of the invention.

According to the present invention a load indicating fastener system is provided which comprises a body to which strain is applied when the fastener is in use, a load sensing means having parts arranged for relative movement in response to change in length or form of the body or an associated washer design under an applied strain, and a separate non-contact gap measuring device, such as an electronic device including a reactance capacitor, or such as an image processing device, or such as a laser device, (hereinafter collectively and/or separately referred to as "a non-contact gap measuring device") which, when secured adjacent to the fastener, registers the said relative movement of the moving parts by a non-contact method.

The fastener system may be in the form of a bolt or stud, a nut and washers, or it may take other forms. In the form of a bolt, the body of the fastener comprises a head and shank which may be of substantially standard form. Similarly, in the form of a stud, the body comprises a shank which may be of substantially standard form. In either of said forms, a washer may incorporate the means of indicating the moving parts being sensed by a separate non-contact gap measuring device of the type described above. In the case of bolt or stud, the load-sensing element responds to a change in length of the shank under the applied strain. In the case of the washer, the load sensing element senses the change of shape in the form of the washer under applied strain. Conveniently, the gap measuring device can be secured at the bolt head, thread end, stud end, or washer where it can easily be secured when the fastener system is in use.

The load-sensing element indicates changes in the length of the body of the fastener, or changes in the form of the washer, or changes in the form of the bolt head as the fastener system is being secured and when the fastener system has been secured. Thus, as the fastener system is being secured, the applied loads will be registered by the non-contact gap measuring device which will indicate when the fastener system reaches a required working load. The non-contact gap measuring device can be attached to the fastener system and obtain a measurement which can be displayed on a computer monitor 24 or other display unit. This measurement can be used during the tightening process. The measurement can be used after the initial tightening to inspect for any changes in the initial strain condition.

Actual fastener system loads may be indicated on the monitor 24 and an electrical output can be used to control power tightening tools (not shown) or indicate a warning when the fastener system desired load has been achieved.

The load sensing means may be arranged to register applied loads up to the fastener system material proof loads, (proof load is the maximum load that can be sustained before there is a permanent change from its original dimensions.)

The creation of a gap that changes with changing strain can be achieved in various ways. In the preferred embodiment the means to create this changing gap comprise a load-sensing element disposed in the direction in which strain is applied to the body when the fastener system is in use, and has an anchorage part. The anchorage part is rigidly anchored to the body at a part of the body in which there is movement when the fastener is applied for use. An air gap between the non-contact gap measuring device and the element widens or reduces depending on whether the fastener is being secured or looses strain. The non-contact gap measuring device reacts by measuring the air gap and registers the applied load on a monitor 24. Preferably the load-sensing element is made of the same material, or at least has the same coefficient of thermal expansion, as the material of the body. This way, changing temperatures at which the fastener system may be used will not affect the functioning of the load-sensing element.

In a preferred embodiment the load-sensing element is a solid diameter bar, one end providing the anchorage part, the other free end to move relative to the fastener. At least part of the load sensing element may be located in a blind bore or passage in the body. When the load sensing means comprises an element, as described above, it may be provided by an insert fitted into the blind end portion of the bore or passage. The anchorage may be anchored into the base of the bore or passage. The bore or passage may have a smaller base portion in which the anchorage part is anchored. Conveniently the non-contact gap measuring device is located at or near the free end of such a bore or passage. There may be direct anchorage of the element to the body, for example by welding, threading or adhesive bonding, or the element may be anchored to the base, which is suitably fixed to the body. The base of the bore or passage may be in the form of a close interference bore into which the element is pressed to provide a secure anchorage.

The load-sensing element may be arranged to operate over a given range of changes of length of the body under applied strain. This will usually be by elongation of the body from the unloaded condition up to the material proof load. When the load is applied to strain the body, the load sensing element moves into the body away from the zero datum (datum means the fixed part on the fastener upper head face that does not move). The non-contact gap measuring device attaches to the body and measures the difference between the datum point (reference point or form) on the body and the load sensing element, and the non-contact gap measuring device is calibrated to indicate load.

For a given elongation under the proof load a required original length can be calculated from:

$$\frac{\text{Original length } E \times A \times \text{extension}}{\text{load}}$$

Where:

$E$ = Youngs Modulus for the material of the body.

$A$ = Cross section area of the body.

For different cross sectional areas and/or proof loads the required original length will vary. For a range of fastener sizes, proof load sensing elements of different lengths may be provided, as required. However, it is generally easier and more economical for production to provide load sensing element means for the fasteners in accordance with the invention with load sensing elements of a standard length and to compensate for the differences by the non-contact gap measuring device.

It is possible for the present invention to give a highly accurate indication of the fastener system applied loads. The indication from the non-contact gap measuring device of the applied loads enables a person to see readily what the applied loading on the fastener system is. This can be from a portable battery operated monitor/display, which may be hand held and connected to the non-contact gap measuring unit by an umbilical connector.

The fastener system may be manufactured without being substantially more expensive than a conventional fastener or similar type. For example, the bores may be pierced during originally manufacturing process. Further more, a conventional fastener may be readily adapted to include the load sensing means in accordance with the present invention.

In another form, the load sensing may be arranged to register applied loads up to the proof load for the material by a load-indicating washer. The washer is designed to deflect under the fastener system strain and the non-contact gap measuring device measures the deflection against a static part of the washer/bolt. The non-contact gap measuring devices are calibrated to indicate the fastener system load as explained above.

In another form, the load sensing may be arranged to register applied loads up to the proof load of the material by measuring the deflection of a specially designed bolt head when the bolt is under strain, the measurement being taken from two parts which are moving relative to each other when the bolt is under strain. The non-contact gap measuring device is calibrated to indicate the fastener system load as explained above.

The method used in the preferred embodiment of the present invention is measurement by reactance which is:

$$\text{Capacitive reactance} = \frac{1}{2\pi FC}$$

$$\text{and capacitance} = \frac{D \times A}{G}$$

$$\text{Hence reactance} = \frac{G}{2\pi FDA}$$

Displacement = change in gap

Where  $F$ = Frequency (hertz)

$C$ = capacitance (farads)

$D$ = dielectric constant (air = 1)

$A$ = area (inch squared)

$G$ = gap (inch)

Set forth below are some of the advantages of the present invention:

1. A non-contact gap measuring device comprising all of the necessary electronics measures a changing air gap or form produced when a fastening system is strained without physically coming into contact with the moving parts being measured.
2. Measuring by non-contact minimizes error from contamination or the environment.
3. The distance being measured is determined from the average mean value of the entire surface being measured, which is not the case for contact methods.
4. The device and method are cost effective because the cost of the fastener will not change significantly, if at all, since only slight modifications need to be made to the fastener to implement the invention.
5. The fastener carries no electric parts.
6. The design modifications to the fastener system will be incorporated during its manufacturing process.

7. The fastener system is suited for even the most rugged applications.
8. Displacement is directly proportional to reactance and will give a linear graph.
9. The fastener system load indication is highly accurate and repeatable.
10. The system is portable and can be used in the field to readily check and easily read the applied loads.

BRIEF DESCRIPTION OF THE SEVERAL VIEWS OF THE DRAWINGS

FIG. 1 is a partly sectioned elevational view of the present invention showing the modifications to a fastener and the measuring element embodied into it for measuring the gap Also shown is the portable reactance capacitor head with a ring type reactance capacitor and a cylindrical type reactance capacitor. The ring type reactance capacitor measures the gap between the face of the ring type reactance capacitor and the fixed part of the fastener. The cylindrical type reactance capacitor measures the gap between the face of cylindrical type reactance and the upper free end of the measuring element. The non-contact gap measuring device computes the difference between the free end of the measuring element and the datum plane (reference). The non-contact gap measuring device computes the difference between the two measurements, and the result is accurately calibrated to indicate clamping load generated by the fastener when it is in use.

DETAILED DESCRIPTION OF THE DRAWINGS

Figure 1:
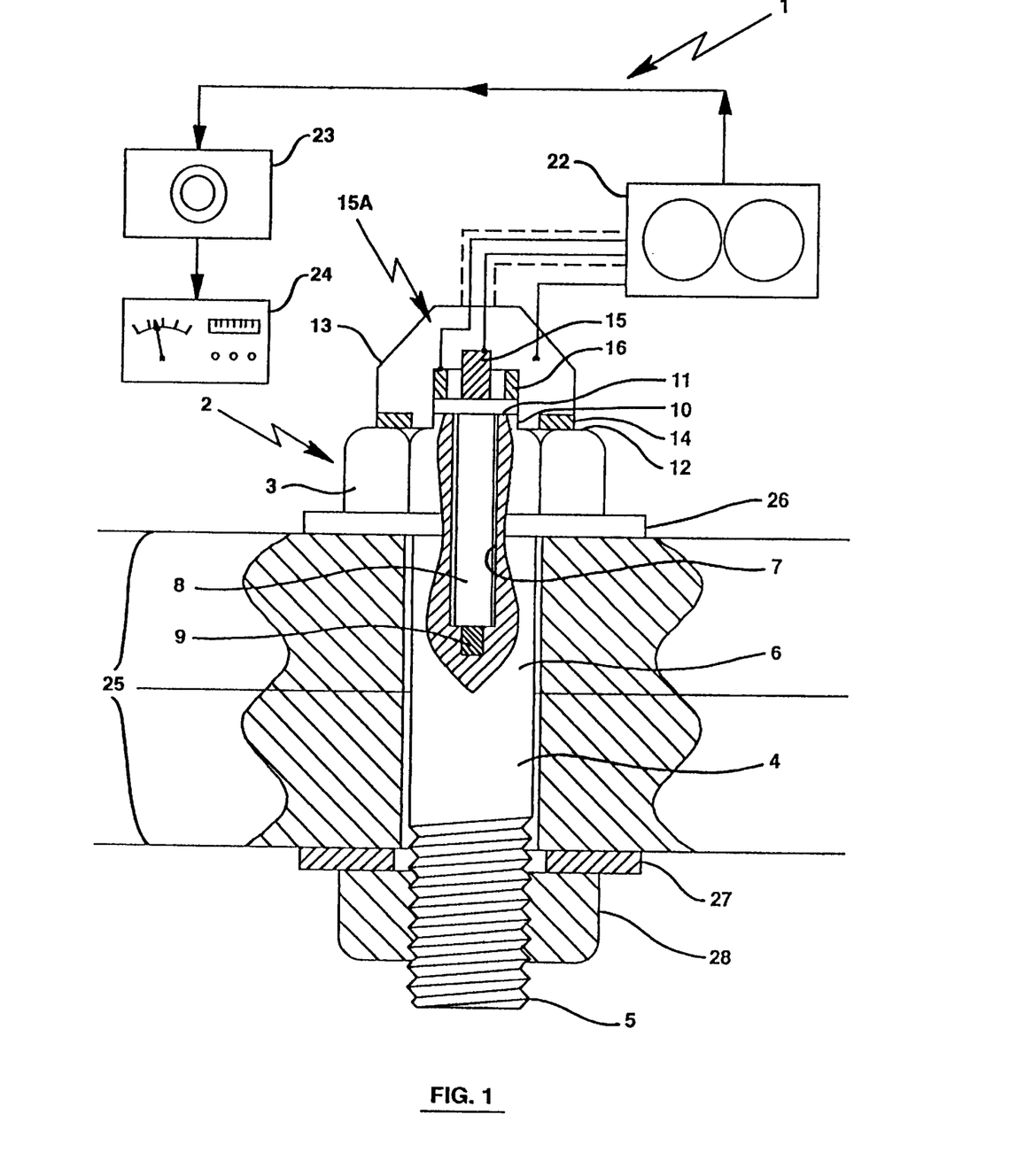
Figure 2:
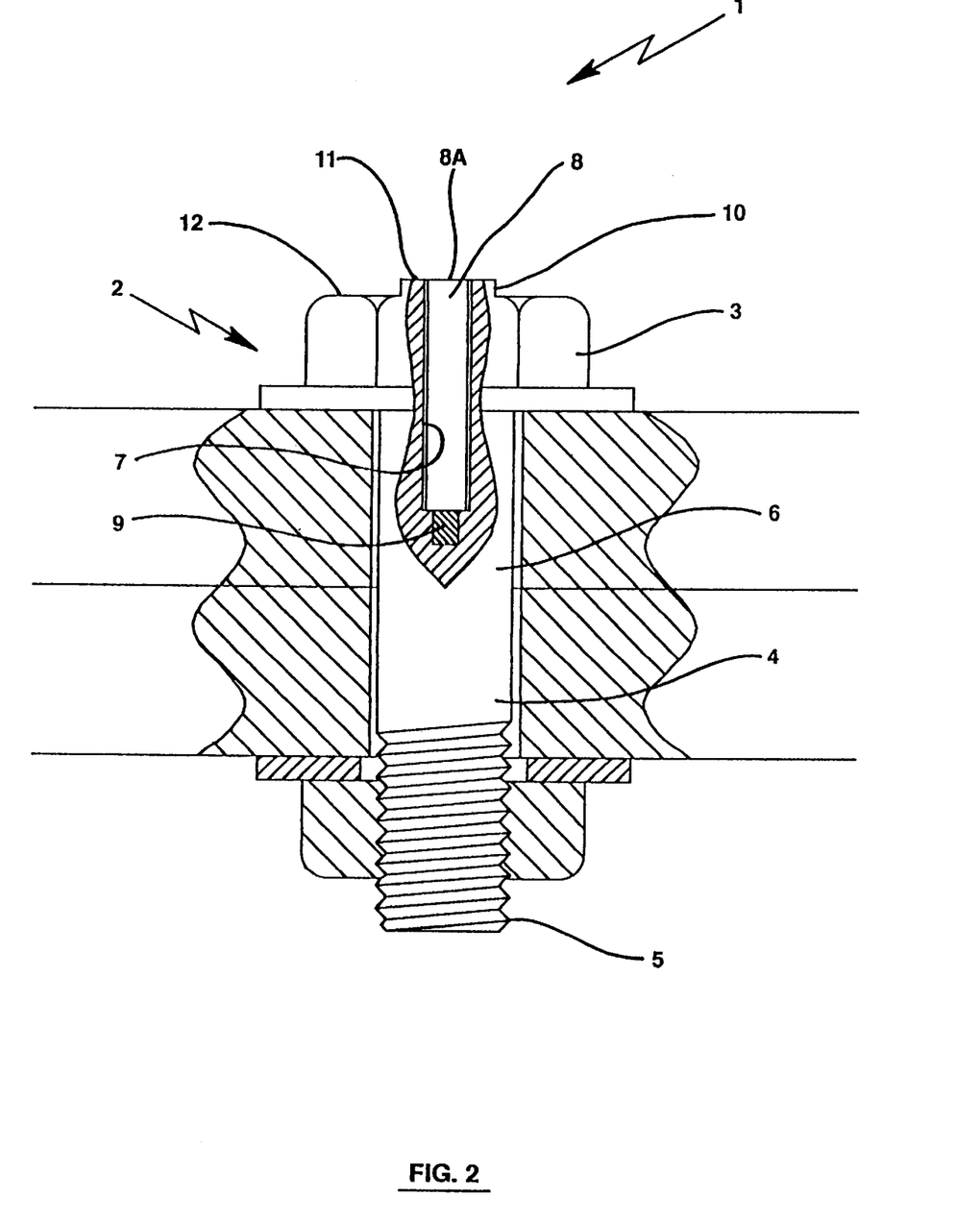
FIG. 2 is a view similar to FIG. 1 showing the fastener described in FIG. 1 without the portable head.

Referring now to the drawings in detail, as in FIGS. 1, 2, there is shown an embodiment of a load indicating faster in bolted joint 25 in which in order to measure the changing gap between the faces of the reactance capacitors 15, 16 and shank 4, there is provided a bolt fastener system 1 having a metal body 2 made from steel, for example, which includes a hexagon head 3 and a shank 4, the shank 4 having an externally screw-threaded portion 5 spaced from the head 3 by a plain cylindrical portion 6, washers 26, 27, a nut 28, and a reactance capacitor 15A which, in the FIG. 1 embodiment, includes the cylindrical reactance capacitor 15 and the ring reactance capacitor 16 for measuring the changing gap.

Drilled into the body 2, co-axially with its rotational axis, is a blind bore 7 which extends from the top of the head 3, through the head 3 and into the shank 4 for is approximately a quarter the length of the plain cylindrical portion 6. The closed inner end of the bore 7 is a lose tolerance smaller counterbore 9, which serves as an anchor for measuring element 8. Supported in the bore 7 is a load sensing means, which comprises the measuring element 8, made from the same material as the body 2. The element 8 is anchored in the bore 7 at counterbore 9. The anchorage could, for example, be pressed into bore 9 or may be secured therein by any of various types of fixing.

The upper surface of head 3 is machined to form a location spigot 10, upper datum face 11 and a lower face 12. The element 8 free end 8A is ground flush with the head 3 upper datum face 11. The element 8 responds to loads applied to the shank 4 by nut 28 when the fastener is in use. The response is related to the extension of the shank 4 under applied loads. It is appropriate for the element 8 to sense applied loads and to indicate said loads up to the proof load for the material of the body 2. Therefore, the element 8 is arranged to respond to the extension of the shank 4 up to the extension caused by the proof load. For this to be achieved the element 8 is set in bore 7 of the body such that the anchorage in counterbore 9 moves the element 8 into or out of the body 2 depending on the load being induced into the shank 4. Therefore, the element 8 free end a moves relative to the head 3 upper datum surface 11 depending upon whether the shank 4 is being loaded or unloaded. When the shank 4 is free from load, the element 8 and the head upper datum surface 11 are flush which indicates no load in the shank 4. Because the shank 4 material obeys Hookes Law, the gap created between the element 8 free end 8A and the head 3 upper datum surface 11 can be calibrated to indicate load by the portable head measuring device 13 up to the proof load of the shank 4 materials. Provided the proof load is no t exceeded, the load indication will be always repeatable.

The portable head 13 carries the reactance capacitors 15, 16 and is constructed to accurately locate on to the head 3 locating spigot 10. The portable head 13 is secured to the head 3 by a magnet 14 mounted an the bottom of portable head 13, or portable head 13 may be secured to head 3 by other known means. The ring type reactance capacitor 16 measures the gap between the face 11B of the capacitor 16 and the head 3 upper datum surface 11. The cylindrical type reactance capacitor 15 measures the gap between the surface 11A of the capacitors 15 and the free end 8A of element 8. The said gaps between the said surfaces and the two capacitors 15, 16 are compared by the non-contact gap measuring device and associated electronics which include reactance capacitors 15, 16, capacitance amplifier 22, signal conditioner 23, and display 24 and which are calibrated to indicate load that the shank 4 is subjected to during its use.

Figure 3:
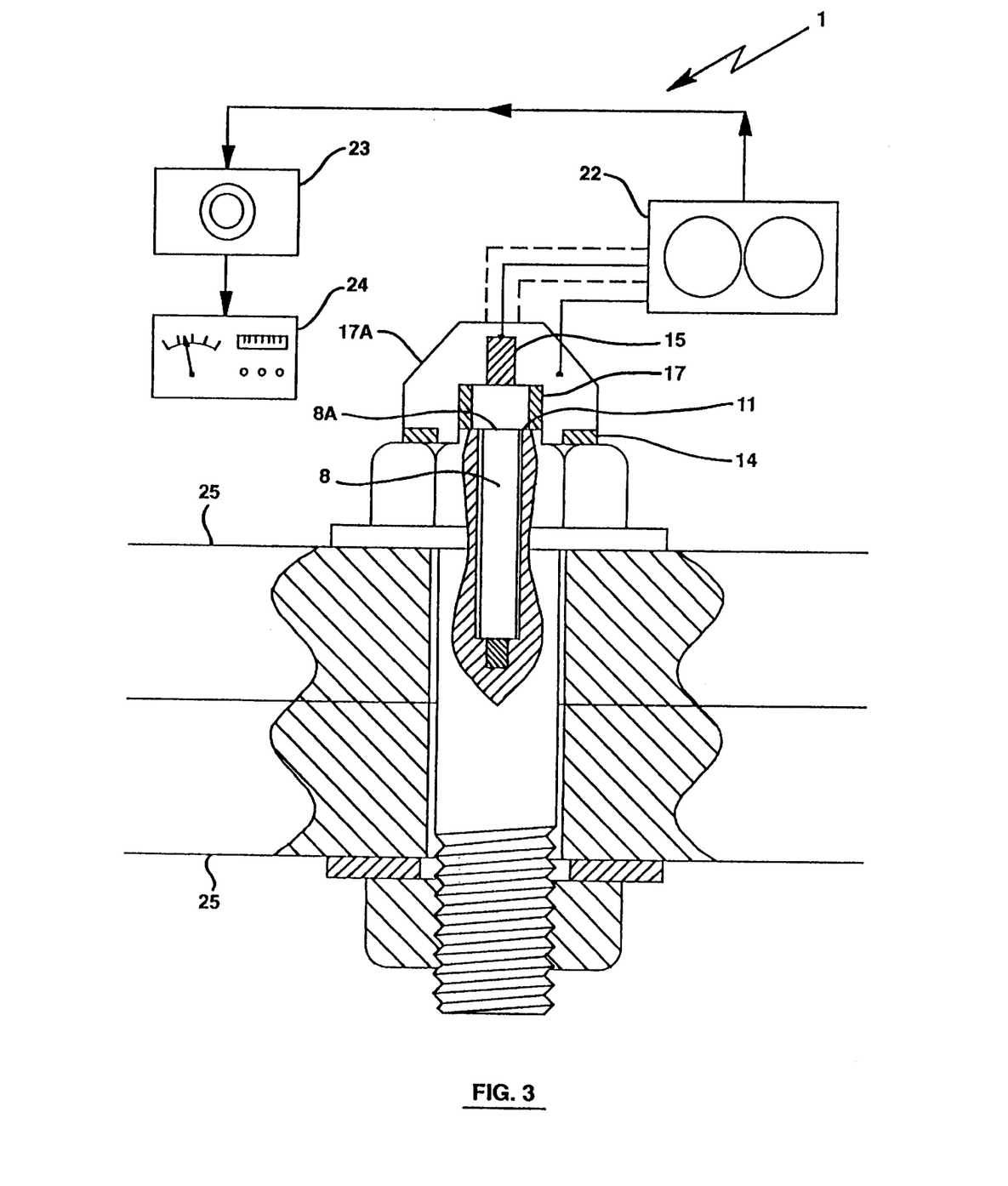
FIG. 3 is a view similar to FIG. 1 showing an alternative option for measuring the gap by using only a cylindrical type reactance capacitor. The portable head is secured to the fixed part of the fastener datum face. The cylindrical type reactance capacitor measures the gap between the face of th cylindrical type reactance and the upper free end of the surface of the measuring element. The non-contact gap measuring device computes the different measurement of the gap and is calibrated to indicate clamping load induced by the fastener when it is in use.

The ring type reactance capacitor 16 of FIG. 1 is replaced in FIG. 3 by a solid metal disc 17 which is mounted in portable head 17A and which abuts the head 3 upper datum face 11. The reactance capacitor 15 still operates in the same way as described for FIG. 1. All other details are as described for FIG. 1. The reactance capacitor 15 compares the difference between the datum surface 11 and the movement of element 8 when the system is in use.

Figure 4:
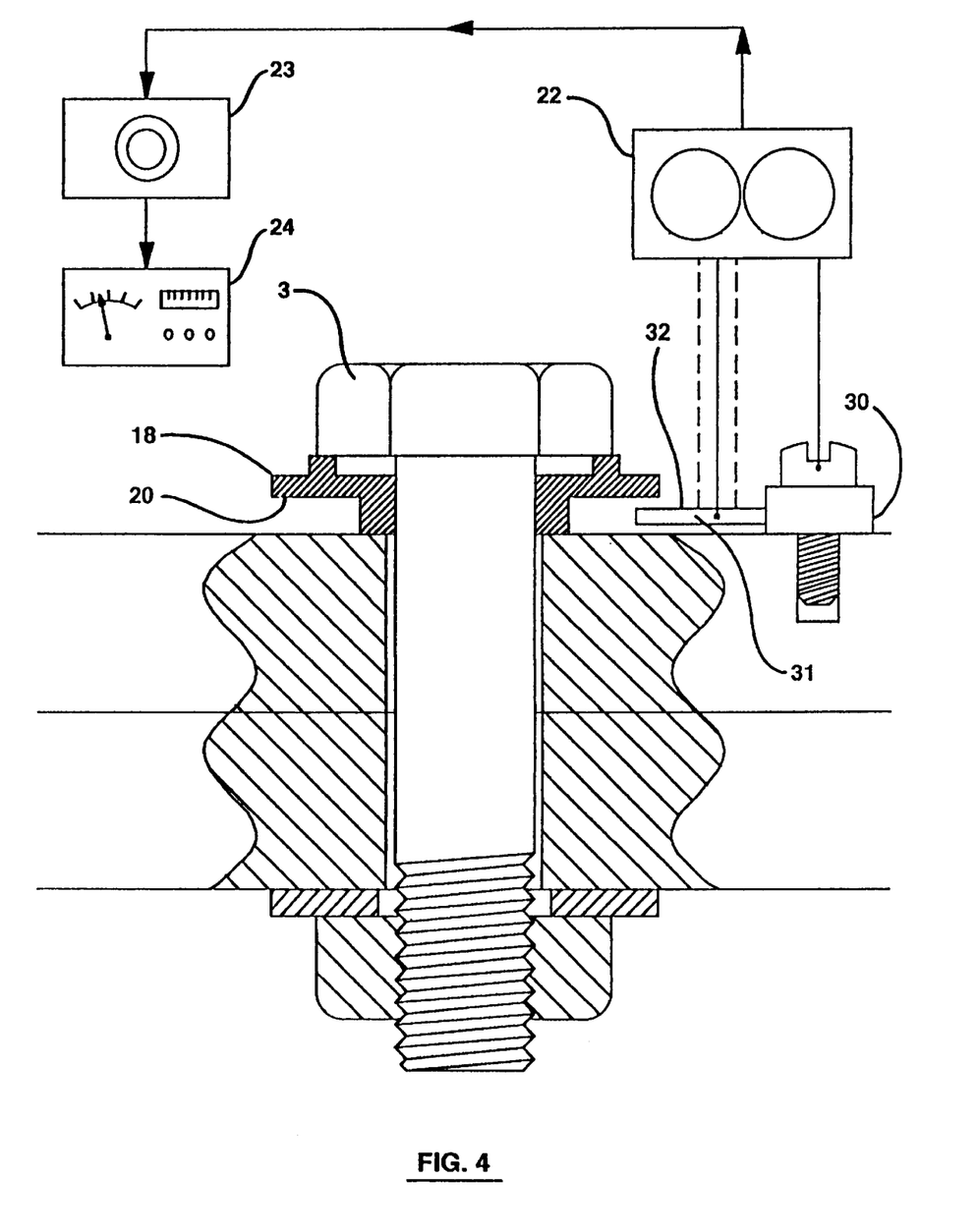
FIG. 4 is a view similar to FIG. 1 showing a specially designed washer that deflects when the fastener system is under strain and an non-contact gap measuring device for measuring the gap. The reactance capacitor non-contact gap measuring device, when secured to the bolted joint, measures the gap between the face of the reactance capacitor and the part being measured on the washer.

As shown in FIG. 4, the fastener system 1 deflects washer 18 when it is in use. The reactance capacitor 31 measures the gap between the face 32 of the capacitor 31 and the washer 18 surface 20. The system operates as described for FIG. 1.

Figure 5:
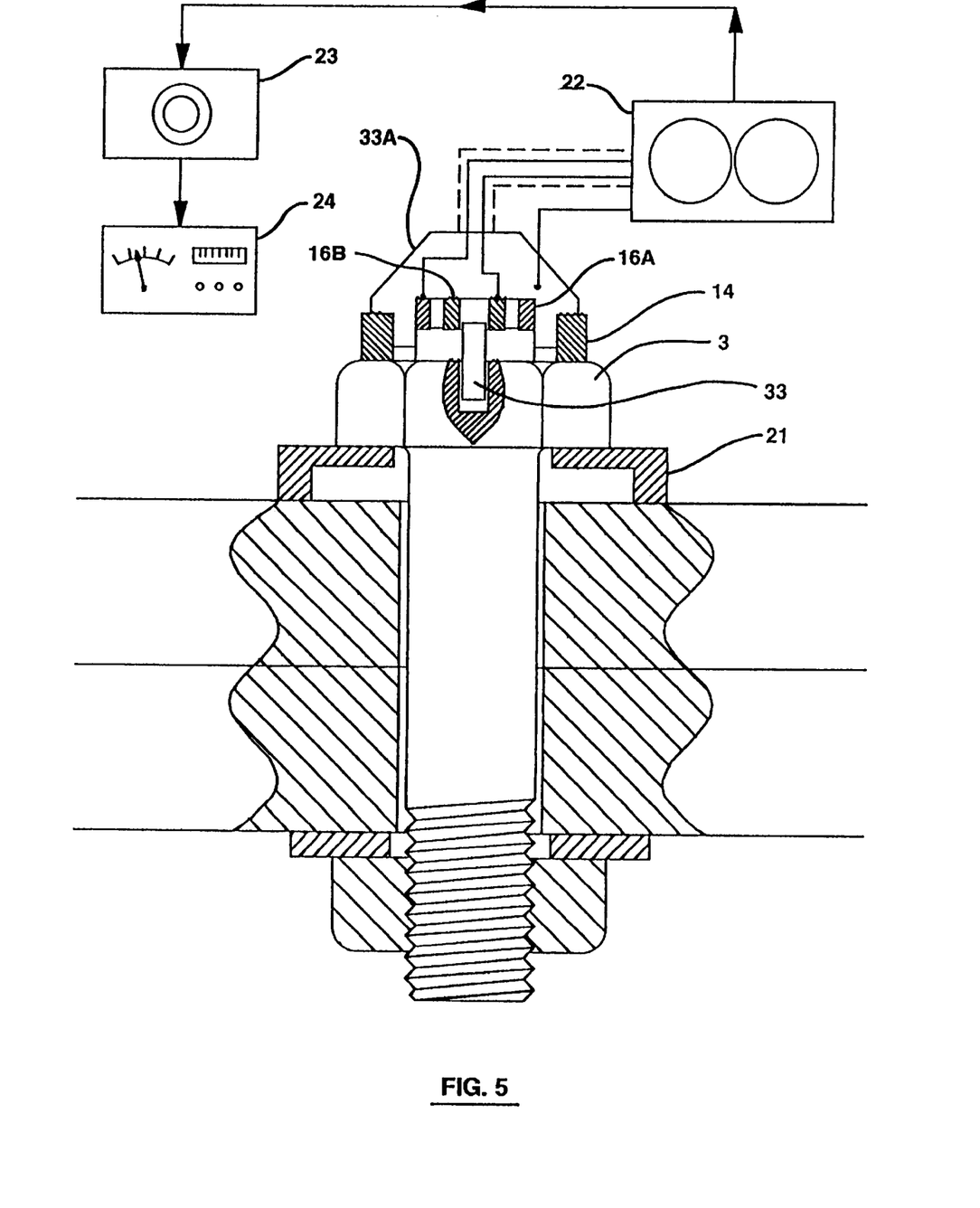
FIG. 5 is a view similar to FIG. 1 showing a specially designed washer that deforms the head of the fastener so that two different parts of the head can be measured relative to each other by the reactance capacitor non-contact gap measuring device when the fastener is under strain.

Shown in FIG. 5 is specially designed washer 21 which deflects the head 3 of the bolt and the ring reactance capacitors 16A, 16B, mounted in portable head 33A and located atop the bolt head 3 by location peg 33, compare two parts of the head 3 relative to each other to indicate load. Otherwise the system is as described for FIG. 1.

Figure 6:
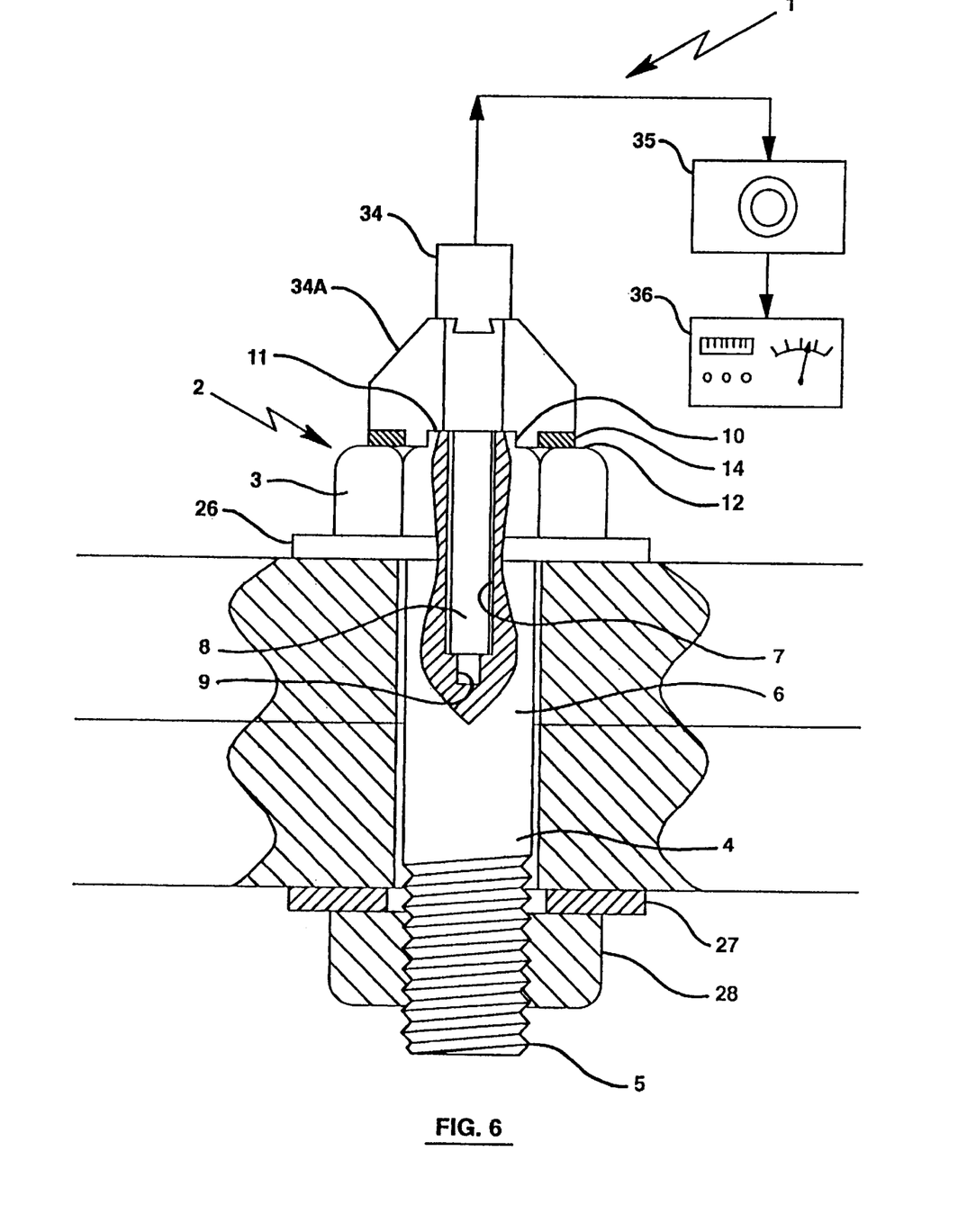
FIG. 6 is a view similar to FIG. 1 showing a further modified form of the present invention with an image processing or laser type gap measuring device fitted for use.

As seen in FIG. 6, the portable head 34A carries the camera or laser 34 which is connected to image processor 35 which is connected to readout 36. Portable head 34A is constructed to accurately locate onto the head 3 locating spigot 10. The portable head 34A is secured to the head 3 by a magnet 14 mounted on the bottom of portable head 34A, or portable head 34A may be secured to head 3 by other known means. The camera or laser system 34, 35 measures the gap between the free end face 8A of the element 8 and the upper datum surface 11 of head 3. The gaps between the datum surface 11 and the free end 8A of the element 8 are compared by the camera or laser system 34, 35 and calibrated to indicate load that the shank 4 is subjected to during its use. The camera 34 can be replaced by a laser 34 and coupled to a processor 35 and to a readout 36 or to a computer (not shown).

Figure 7:
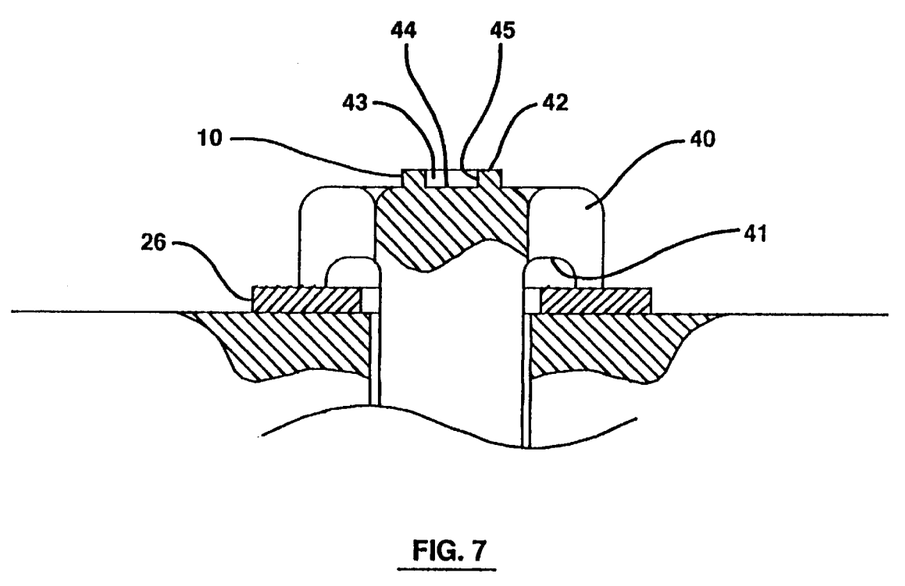
FIG. 7 is a view similar to FIG. 1 showing a fastener head which is modified to deflect under load when the fastener is subject ed to a tensile force.

As seen in FIG. 7 an alternative option for measuring the fastener head 40 deflection when the system is under load. The specially designed head 40 is shaped with an annular groove 41, a spigot 10 having an annular outer face 42 surrounding a recess 43 having a floor 44 and cylindrical wall 45, and the portable monitor 34A with the camera or laser 34 detects the change in shape of the head when under load. The electronics is calibrated to recognize the load scale from zero to proof load of the material and indicates load induced into the fastener.

Figure 8:
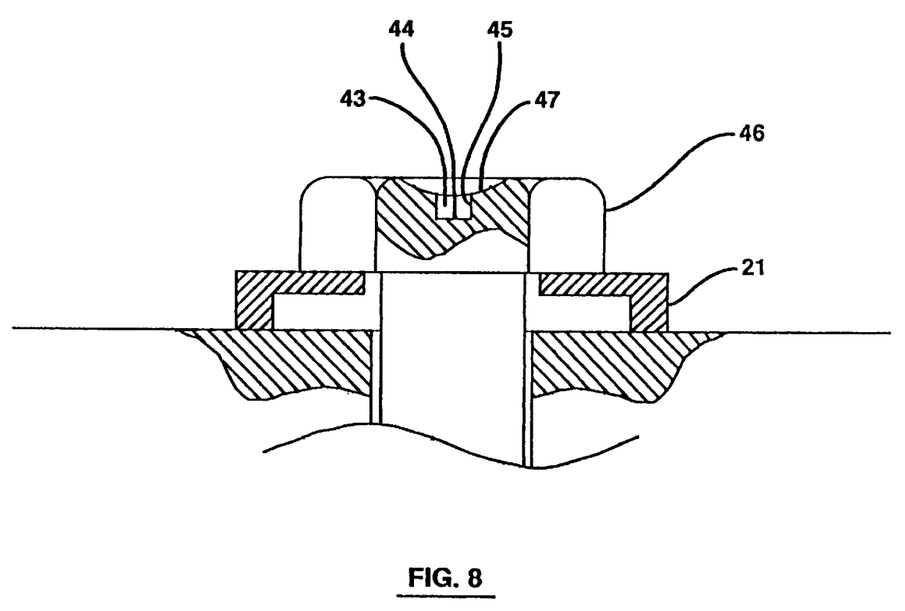
FIG. 8 is a view similar to FIG. 1 showing a further modification of the present invention having a specially designed washer that deflects and also deflects the fastener head under load when the fastener is subjected to a tensile force.

FIG. 8 is the same as that described in FIG. 7, but a special washer 21 causes the specially designed head 46, having recess 43 with floor 44 and wall 45 and outboard concave face 47, to deflect.

Figure 9:
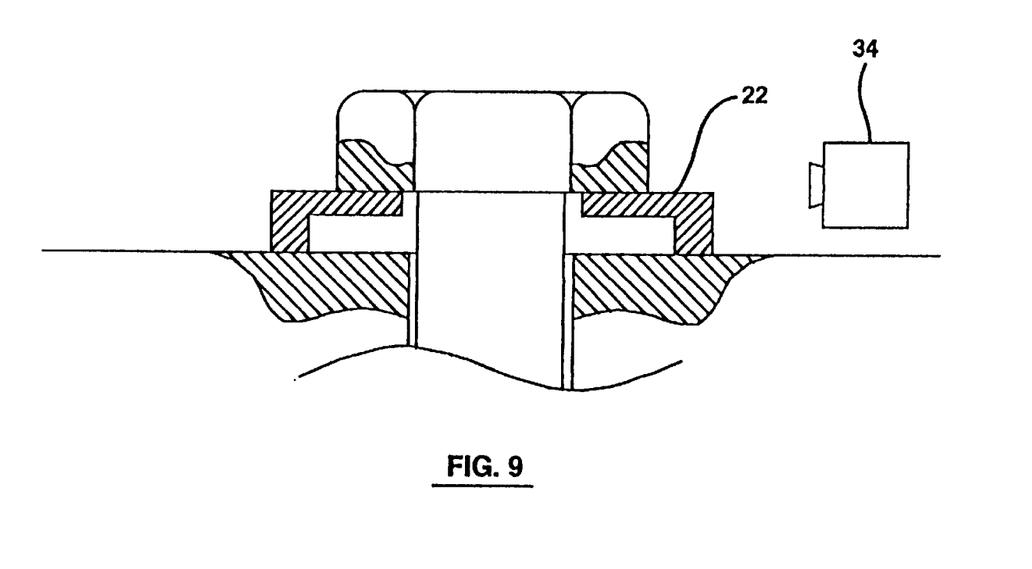
FIG. 9 is a view similar to FIG. 1 showing a further modification of the present invention in which the specially designed washer of FIG. 9 deflects under load when the fastener is subjected t o a tensile force and the change in the gap is measured from the side of the system.

FIG. 9 is the same as that described in FIG. 8, but the changing shape of the special washer 22, due to the fastener system loading up to the material's proof load, is detected by either the camera or laser 34 as shown.

The foregoing description of preferred embodiment and best mode of the invention known to applicant at the time of filing the application has been presented for the purposes of illustration and description. It is not intended to be exhaustive or to limit the invention to the precise form disclosed, and obviously many modifications and variations are possible in the light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A load measuring apparatus comprising:

an externally mounted camera or laser supported in a portable sensing head and configured and constructed for sensing a changing gap, between, on the one hand, an end face of a bar in and anchored to a base of a bore in a bolt head and shank of a fastener system and, on the other hand, a datum face of the bolt head of the fastener system, caused by longitudinal extension of the shank under strain relative to the datum face on the bolt head without contacting the relatively moving portions of the fastener system, and a generating circuit responsive to the sensed changing gap for providing an output signal indicative of a clamp load applied to the fastener system.

2. A load measuring apparatus comprising: a camera or laser, externally removably positionable and supportable on a portable detector head atop a fastener system to be visually or light beam coupled, respectively, to a bolt head of the fastener system along an axis parallel to the longitudinal axis of the fastener system configured and constructed for sensing a changing form caused by a deflection of a first portion of the bolt head relative to a second portion of the bolt head when the fastener is under strain without contacting the sensed portions of the bolt head, and a generating circuit responsive to the sensed changing form for providing an output signal indicative of a clamp load applied to the fastener.

3. The apparatus of claim 2 further comprising:
a bolt head shape including a central recess in an outboard face.

4. The apparatus of claim 2 further comprising:
a bolt head shape including a concave outboard face.

5. The apparatus of claim 2 further comprising:
a bolt head shape including an inboard annular groove in the underside of the bolt head and a spigot on the top side of the bolt head with a central recss therein.

6. The device of claim 2 further comprising the changing form is a bolt head and a washer combination of the fastener system under strain.

7. A measuring device comprising a portable sensing head, having a first cylindrical capacitor plate fixedly supported in the portable sensing head, eternally removably positionable atop an integral head portion of a fastener system, and constructed and configured for directly capacitively coupling to a second cylindrical capacitor plate movably supported in the fastener system to form a capacitor for use in a circuit for detecting a changing gap, measured from a reference datum plane of the bolt head of the fastener system, the changing gap being produced in the fastener when the fastener system is under strain and causing a variance in the capacitive reactance of the detection circuit without the portable sensing head contacting the second movable capacitor plate.

8. The apparatus of claim 7 further comprising:
a bolt head shape including a central recess in an outboard face.

9. The apparatus of claim 7 further comprising:
a bolt head shape including a concave outboard face.

10. The apparatus of claim 7 further comprising:
a bolt head shape including an inboard annular groove in the underside of the bolt head and a spigot on the top side of the bolt head with a central recss therein.

11. The device of claim 7 further comprising the changing form is a bolt head and a washer combination of the fastener system under strain.

12. A measuring device comprising a sensing circuit having a first capacitor plate externally removably positionable beside a deflectable washer mounted between an integral head portion of a fastener system and a workpiece, and constructed and configured for directly capacitively coupling to a second capacitor plate movably supported on the washer of the fastener system to form a capacitor for use in a circuit for detecting a changing gap between the first and second capacitor plates, the changing gap being produced when the fastener system is under strain and causing a variance in the capacitive reactance of the detection circuit without the sensing circuit contacting the second movable capacitor plate.

13. A measuring device comprising a portable sensing head, having multiple first capacitor plates fixedly supported in the portable sensing head, externally removably positionable atop an integral head portion of a fastener system, and constructed and configured for directly capacitively coupling each of the first capacitor plates to a common second capacitor plate movably supported on the fastener system to form multiple capacitors for use in a circuit for detecting a changing form of the bolt head of the fastener system, the changing form being produced in the fastener when the fastener system is under strain and causing a variance in the capacitive reactance of the detection circuit.

14. A measuring device comprising a portable sensing head, having first, spaced apart, capacitor plates fixedly supported in the portable sensing head, externally removably positionable atop an integral head portion of a fastener system, and constructed and configured for directly capacitively coupling the first capacitor plates to a second capacitor plate a portion of which is movably supported in the fastener system to form multiple capacitors for use in a circuit for detecting a changing gap, measured from a reference datum plane of the bolt head of the fastener system, the changing gap being produced in the fastener when the fastener system is under strain and causing a variance in the capacitive reactance of the detection circuit without the portable sensing head contacting the second movable capacitor plate.

15. A measuring device comprising a portable camera or laser which, when externally removably positioned and supported alongside of a bolt head and deflectable washer of a fastener system and visually or light beam coupled, respectively, to the bolt head and washer along an axis cutting the longitudinal axis of the fastener system at a substantial angle, detects a changing gap or form produced in the fastener when the system is under strain without contacting the sensed portions of the fastener undergoing significant relative movement.

16. A device of any one of claims 1–15 used to indicate load of the fastener.

17. A device of any one of claims 1–15 used to indicate when the load on the fastener reaches a predetermined load.

18. A device of any one of claims 1–15 used to communicate with a fastener tightening mechanism.

19. A device of any one of claims 1–15 used to transmit a signal for remote sensing.

20. A device of any one of claims 1–15 used to determine that the fastener system is still within the desired design pre-load window.

21. A device of any one of claims 1–15 used to indicate load at elevated temperatures.

22. A device of any one of claims 1–15 used to give a warning or signal when a desired fastener system pre-load is reached.

23. The device of any one of claims 1–11, 13–14 further comprising:
an attachment portion having an end portion for mounting the detector head atop a head of the fastener.

24. The device of claim 23 wherein the end portion further comprises:
a recessed opening In the detector head along its longitudinal axis terminating in a flat end face orthogonal thereto for fitting around a spigot of the fastener.

25. The device of claim 23 wherein the end portion further comprises:
a recessed opening in the detector head along its longitudinal axis for receiving a locator peg positionable within the portable head and the fastener head for guiding the detector head into a position relative to the fastener.

26. The device of claim 23 wherein the end portion further comprises:
a magnet mounted therein.

27. The device of claim 23 wherein the end portion further comprises:
a friction fit with the spigot.

28. The apparatus of claim 13 wherein the at least one reactance capacitor further comprises:
a pair of concentrically mounted ring capacitors.

29. The apparatus of claim 28 wherein the pair of ring capacitors further comprises:
a bottom face of each capacitor is equally spaced from an end plane of the detector head orthogonal to the longitudinal axis of the detector head.

30. The apparatus of claim 14 wherein the multiple first capacitor plates further comprise:
a cylindrically shaped capacitor mounted concentrically with a ring shaped capacitor.

31. The apparatus of claim 30 wherein the cylindrically shaped capacitor mounted concentrically with the ring shaped capacitor further comprises:
a bottom face of each capacitor is equally spaced from an end plane of the detector head orthogonal to the longitudinal axis of the detector head.

32. The apparatus of claim 30 wherein the cylindrically shaped capacitor mounted concentrically with the ring shaped capacitor further comprises:
a bottom face of each capacitor is spaced apart from each other and from an end plane of the detector head orthogonal to the longitudinal axis of the detector head.

* * * * *